United States Patent [19]

Dunfield et al.

[11] Patent Number: 5,473,484
[45] Date of Patent: Dec. 5, 1995

[54] APPARATUS FOR ELECTRICALLY GROUNDING A ROTOR HUB IN A DISC DRIVE MOTOR

[75] Inventors: John C. Dunfield; Robert M. Pelstring, both of Santa Cruz, Calif.

[73] Assignee: Seagate Technology, Inc., Scotts Valley, Calif.

[21] Appl. No.: 253,401

[22] Filed: Jun. 3, 1994

[51] Int. Cl.$^6$ .................................................. G11B 17/02
[52] U.S. Cl. .................................................. 360/99.08
[58] Field of Search ........................ 360/98.07, 99.04, 360/99.08; 277/80

[56] References Cited

U.S. PATENT DOCUMENTS

| | | | |
|---|---|---|---|
| 4,673,997 | 6/1987 | Gowda et al. | 360/107 |
| 4,779,165 | 10/1988 | Elsaesser et al. | 360/97 |
| 5,011,165 | 4/1991 | Cap | 277/80 |
| 5,140,479 | 8/1992 | Elsing et al. | 360/97.01 |
| 5,267,737 | 12/1993 | Cossette et al. | 277/80 |
| 5,367,416 | 11/1994 | Cossette et al. | 360/97.02 |

*Primary Examiner*—Robert S. Tupper
*Attorney, Agent, or Firm*—Westman, Champlin & Kelly

[57] ABSTRACT

A disc drive includes a disc drive motor for rotating a storage disc. The motor includes a motor base having a fixed member. A rotor is rotatably coupled to the fixed member and carries the storage disc. First and second bearings are positioned between the rotor and the fixed member allowing rotation of the rotor about the fixed member. A permanent magnet is positioned between the first and second bearings. A conductive fluid between the rotor and the fixed member is maintained in operable contact with the rotor and the fixed member by the permanent magnet. The ferrofluid provides a low resistance electrical path between the rotor and the fixed member thereby electrically grounding the rotor to the motor base.

13 Claims, 4 Drawing Sheets

APPARATUS FOR ELECTRICALLY GROUNDING A ROTOR HUB IN A DISC DRIVE MOTOR

BACKGROUND OF THE INVENTION

The present invention relates generally to the field of disc drive data storage devices. More specifically, the invention relates to providing an electrical path between a hub and a shaft of a disc drive motor used for spinning the discs in a disc drive.

Disc drive data storage devices of the "Winchester" type are well known in the industry. Such devices utilize rigid discs coated with a magnetizable medium for storage of digital information in a plurality of circular concentric tracks. This information is written to and read from the discs using a transducing head mounted on an actuator mechanism which moves the head from track to track across the surface of the disc under control of electronic circuitry. The discs are mounted for rotation on a spindle motor which causes the discs to spin and the surface of the discs to pass under the heads.

As industry demands for smaller sizes of disc drives has lead to the introduction of half-height five and one-quarter inch drives, three and one-half inch, two and one-half inch, 1.8 inch and smaller drives, the size and configuration of the spindle drive motor has also changed. "Pancake" spindle drive motors have been used which employ an air gap in the motor which was positioned axially to the motor shaft. "In-hub" spindle motors used motor coils and magnets which were located inside the disc-carrying hub. Also, under-hub motors are common for disc drive spindle motors. These configurations may be either of a rotating or a stationary shaft configuration.

A conductive path should be provided between the storage disc and hub assembly and the drive shaft of the motor. This path prevents charge build-up on the storage disc which can particularly be a problem when using thin film and, more recently, magnetoresistive readback heads. U.S. Pat. No. 5,140,479, issued Aug. 18, 1992, to Elsing et al. entitled STATIC ELIMINATOR FOR DISC DRIVE SPINDLE describes a device used to reduce static build-up on the storage disc. In the Elsing reference, a spring-loaded conductive button provided a conductive path between the spindle hub and electrical ground. The interest is in providing a ground controlled path from head to disc. The disc is connected to the motor rotor through conductive spaces. The head is electrically connected to the actuator arm and the motor base.

In general, ferrofluid seals have been used for providing a seal to a disc drive motor to provide a barrier which prevents particles from entering the disc environment. Such a seal is shown in, for example, U.S. Pat. No. 5,011,165, issued Apr. 30, 1994, to Cap, entitled SEALING DEVICE ESPECIALLY FOR HARD DISK DRIVES.

Typical hard disc drives have used thin film magnetic heads for reading and writing information. In such a system, the electrical resistance between the magnetic storage disc to the magnetic head through the hub, motor base and arm is important. However, with the advent of magnetoresistive heads, the electrical resistance of this path needs to be more precisely known and relatively stable. In the prior art, the bearings and ferrofluid seals have provided an electrical path between the rotor and electrical ground. However, the electrical resistance of the bearings has been unstable and varies over time, temperature variations and voltage. The increase in resistance as the grease channels with time is on the order of two or three times and more. The voltage breaks down across the bearings at about 2.5 to 5 volts due to breakdown of the insulator capability of the grease. Such breakdown could damage the head. The ferrofluid seal appears as a conductor in parallel with the conductance of the bearings. The ferrofluid seal typically has a comparable electrical conductance relative to "new" bearings. Typical resistance values are on the order of 25 M$\Omega$.

The art lacks an adequate mechanism for providing a controlled electrical path between the rotor and electrical ground in a disc drive motor.

SUMMARY OF THE INVENTION

The disc drive spindle motor of the present invention provides a low resistance path-contact controlled electrical path between a rotor and a base of the motor. The motor includes a motor base coupled to a fixed member. The rotor rotatably carries a storage disc of the disc drive and is rotatable about the fixed member. First and second bearings are spaced apart along the fixed member and rotatably couple the rotor to the fixed member. A permanent magnet is positioned between the first and second bearings. A conductive ferrofluid is carried between the rotor hub and the fixed member, and maintained in operable contact with the rotor hub and the fixed member by the permanent magnet. The fixed member connects to the base with negligible electrical resistance. The permanent magnet and the ferrofluid provide a low resistance electrical path between the rotor hub and the fixed member thereby electrically grounding the rotor hub.

In one embodiment of the invention, the permanent magnet is coated with a conductive material. During operation, the electrical resistance between the rotor hub and electrical ground is less than about 2.5 M$\Omega$.

DETAILED DESCRIPTION OF THE PREFERRED EMBODIMENTS

Figure 1:
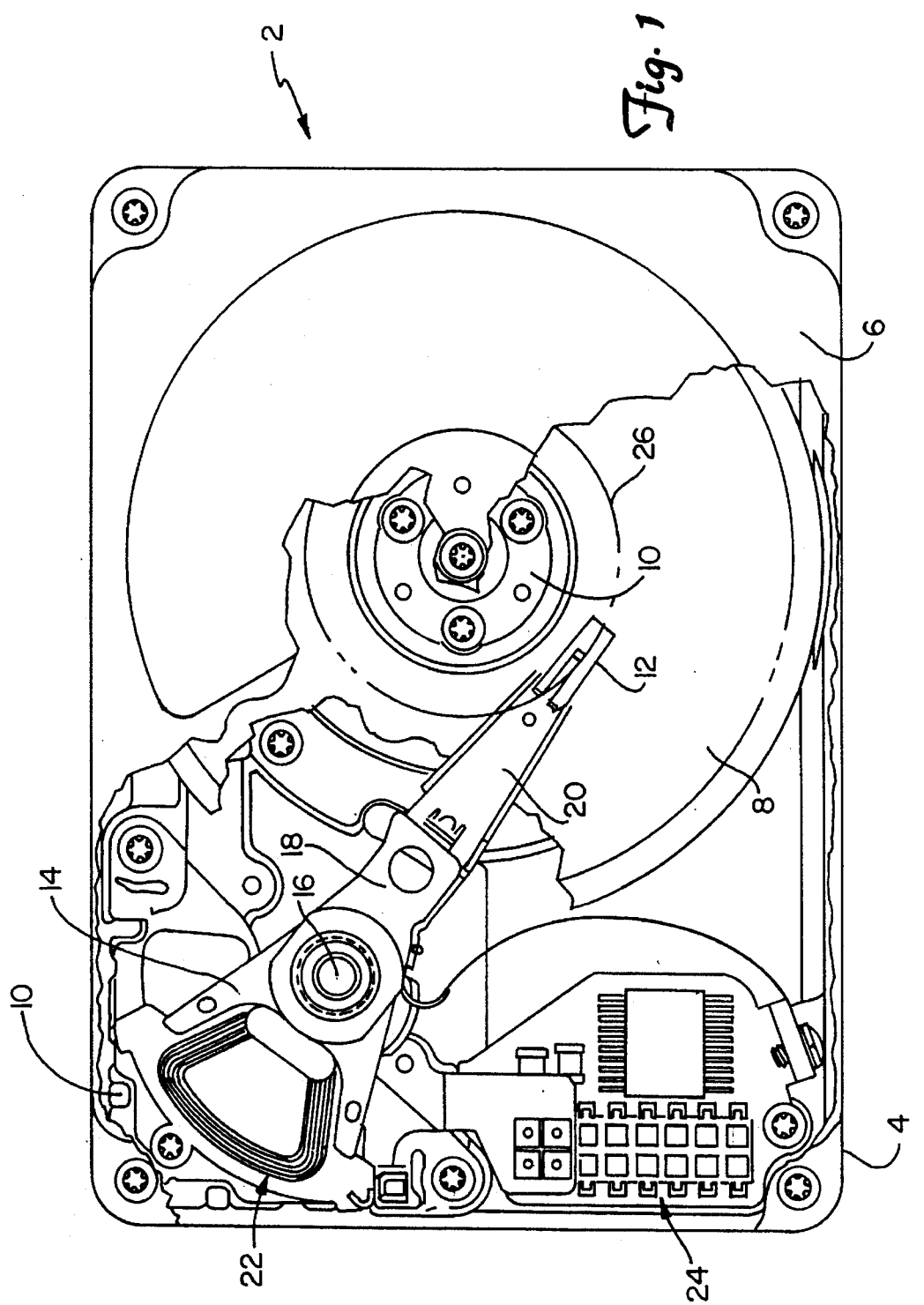
FIG. 1 is a plan view of a disc drive data storage device in which the present invention is useful.

FIG. 1 shows a plan view of a disc drive 2 for use with the present invention. Disc drive 2 includes a base member 4 to which internal components of the unit are mounted. Base member 4 couples to top cover 6 which forms a sealed environment for critical parts of disc drive 2.

Disc drive 2 includes a plurality of discs 8 which are mounted for rotation on a spindle motor, shown generally at 10. Motor 10 is described below in greater detail. A plurality of magnetic read/write heads 12, usually one per disc surface, are mounted to an actuator 14. In the example shown at drive 2, actuator 14 is a rotatory actuator which is mounted for pivoting about a pivot axis 16. Actuator 14 includes a number of head mounting arms 18 which couple heads 12 to the actuator body via a plurality of load beam/gimbal assemblies 20. Actuator motor 22 is also coupled to actuator body 14 to provide a force to move heads 12 to a desired position on the surface of disc 8.

In operation, the spindle motor 10 causes disc 8 to rotate. Electronic circuitry 24 energizes actuator motor 22 causing actuator 14 to rotate about pivot 16 whereby magnetic read/write head 12 is moved through an arc radially across the surface of disc 8. Actuator 14 positions head 12 over a concentric track, for example track 26 of disc 8. This allows electronic circuitry 24 to read back or write information at desired locations on disc 8.

Figure 2:
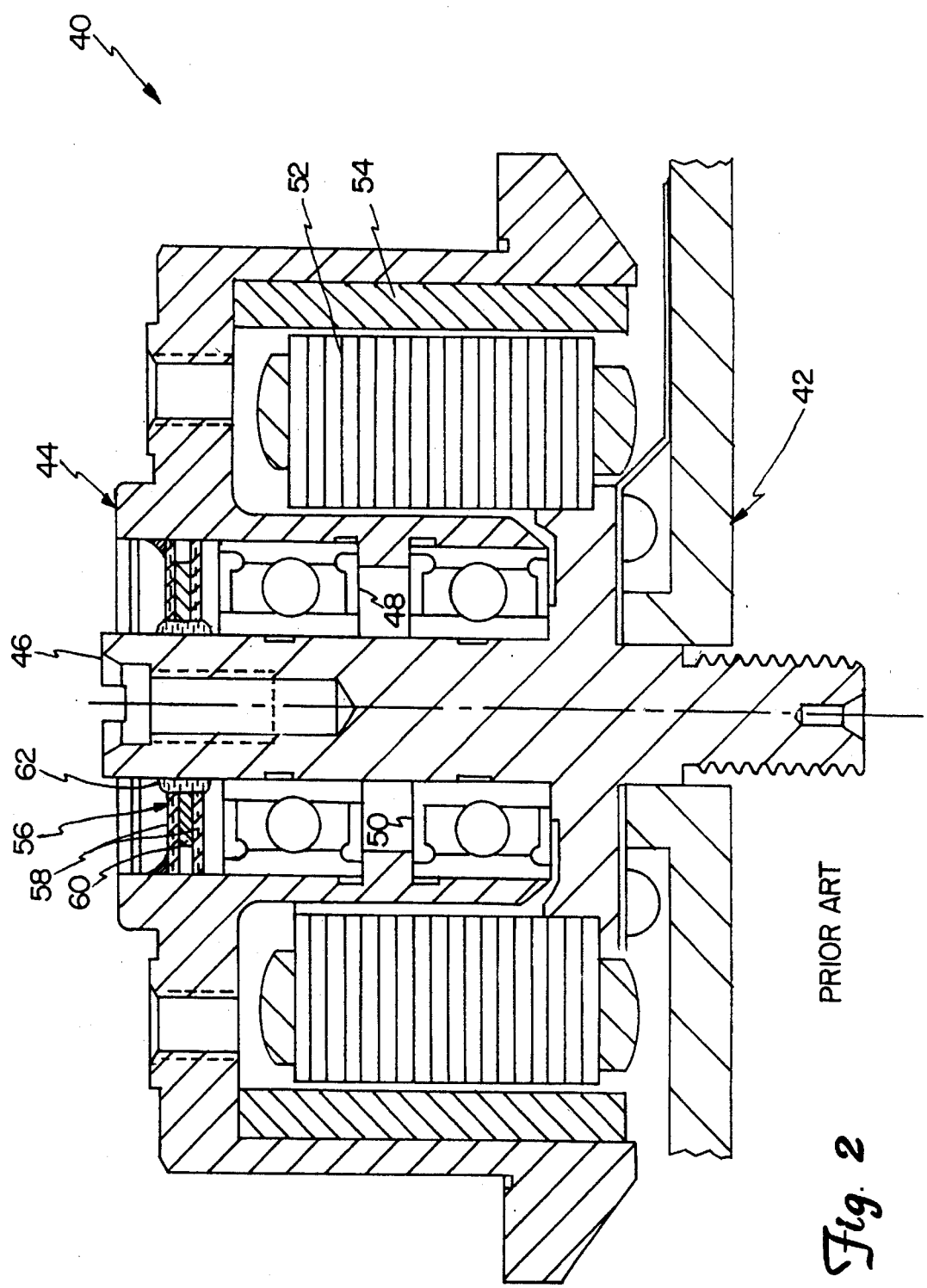
FIG. 2 is a cross-sectional view of a prior art disc drive motor.

FIG. 2 is a cross-sectional view of a prior art disc drive motor 40 of a stationary shaft design. Motor 40 includes motor base 42 and rotor hub 44. Rotor hub 44 carries a storage disc (not shown in FIG. 2) and is rotatable about fixed member drive shaft 46 which is coupled to motor base 42. First bearing 48 and second bearing 50 rotatably couple rotor hub 44 to drive shaft 46 of motor 40. Motor 40 includes stator assembly 52 coupled to base 42 and permanent magnet 54 coupled to rotor hub 44. Interaction between stator 52 and magnet 54 causes rotor hub 44 to rotate about drive shaft 46.

Prior art motor 40 includes a ferrofluid seal 56. Such a seal is described in U.S. Pat. No. 4,779,165 issued Oct. 18, 1988 to Elsaesser et al. entitled DISK STORAGE DRIVE. Related ferrofluid seals are described in U.S. Pat. No. 5,267,737 issued Dec. 7, 1993 to Cossette et al. entitled MAGNETIC FLUID SEAL CONTAMINANT SHIELD. As described elsewhere, ferrofluid seal 56 provides a barrier to contaminants generated from bearings 48 and 50 thereby preventing such contaminants from entering the sealed environment which carries the storage disc 8. Ferrofluid seal 56 includes permanent magnet 58 and pole pieces 60 which are coupled to rotor hub 44. A conductive ferrofluid 62 is in fluid contact with the outer circumference of drive shaft 46 and the pole piece 60/magnet 58 assembly. The interaction between ferrofluid 62 and permanent magnet 58 cause ferrofluid 62 to form a seal between bearings 48 and 50 and the internal environment which contains the storage disc. However, ferrofluid seal 56 does not provide sufficient electrical conductivity for use as a reliable electrical ground between rotor hub 44 and drive shaft 46 having a stable known resistance.

Figure 3:
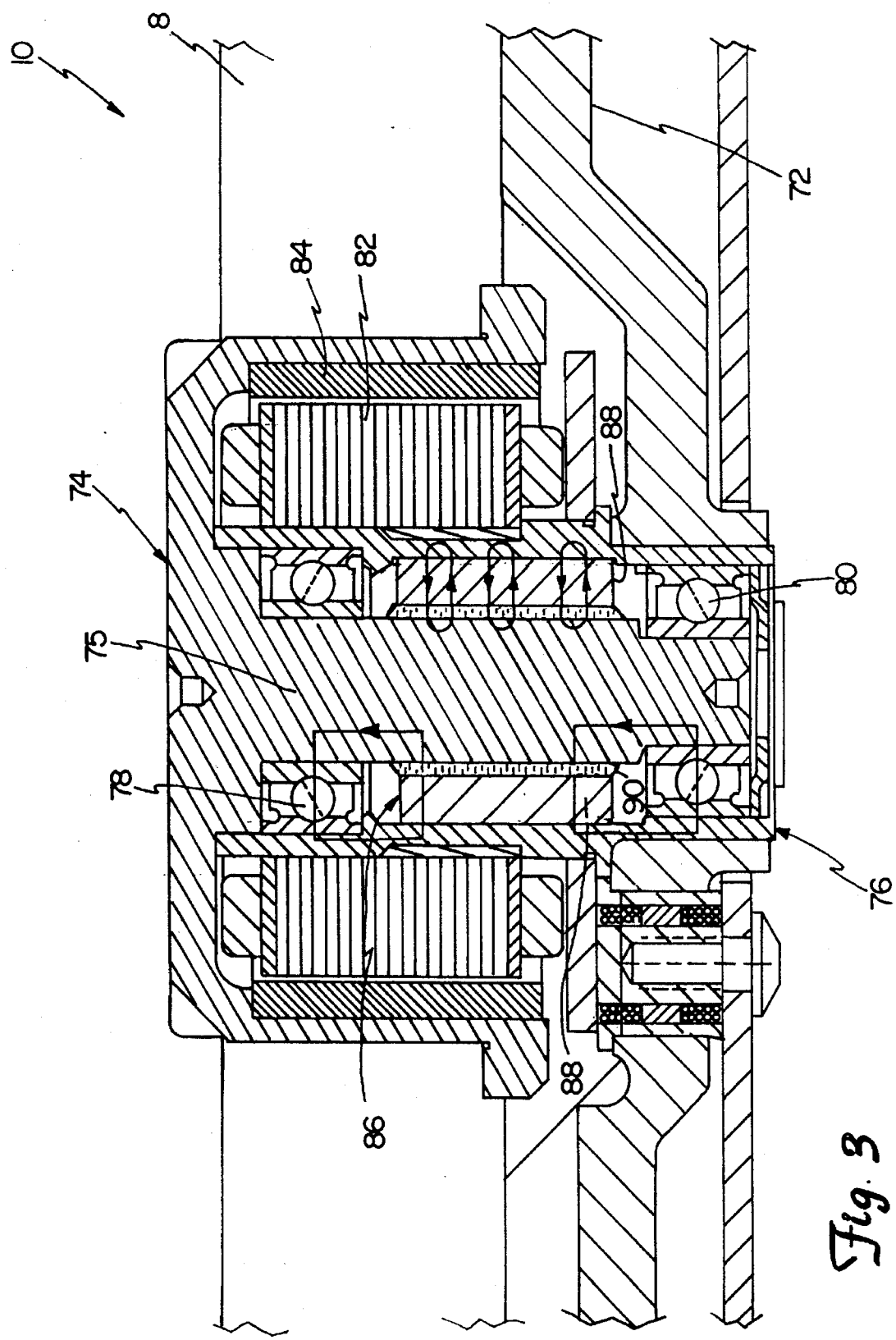
FIG. 3 is a cross-sectional view of a disc drive motor in accordance with the present invention.

Turning now to FIG. 3, spindle drive motor 10 of a rotating shaft design is shown in cross-section in accordance with the present invention. Drive motor 10 includes motor base 72 and rotor shaft 74. A fixed member bearing sleeve 76 is coupled to motor base 72 and forms a sleeve which rotatably receives rotor shaft 74 which carries disc 8. Upper bearing 78 and lower bearing 80 are positioned between rotor shaft 74 and bearing sleeve 76 and rotatably couple shaft 74 to sleeve 76. Stator assembly 82 is coupled to drive sleeve 76 and permanent magnet 84 is coupled to rotor shaft 74. Electrical signals supplied to windings in stator assembly 82 cause rotor shaft 74 to rotate about sleeve 76 due to the interaction between stator assembly 82 and magnet 84.

FIG. 3 also shows grounding mechanism 86 in accordance with the present invention. Mechanism 86 includes a cylindrical permanent magnet 88 coupled to bearing sleeve 76 in ferrofluid 90. Ferrofluid 90 fills a gap between permanent magnet 88 and rotor shaft 74. In the present invention, permanent magnet 88 and rotor shaft 74 have been positioned between bearings 78 and 80 thereby allowing magnet 88 and the ferrofluid interface to be lengthened along the axial direction of motor 10. The magnetic field strength is designed for concentration of the fluid so it does not disperse under shock, vibration or temperature gradient.

In one embodiment, the area of the ferrofluid is increased to achieve a resistance of less than 2.5 MΩ. This provides a greater surface area for ferrofluid 90 to couple to magnet 88 and rotor shaft 74. This increased surface area decreases the electrical resistance thereby providing a more reliable electrical path for grounding rotor shaft 74 than prior art designs.

In a preferred embodiment, magnet 88 is coated with an electrically conductive material such as nickel to provide improved electrical grounding. The coating should also be smooth to reduce friction. Additionally, although in FIG. 3 magnet 88 is shown coupled to sleeve 76, in another embodiment magnet 88 can be mounted to rotor shaft 74. The flux lines on the left half of magnet 88 show a uni-polar type magnetization. the flux lines on the right side are when magnet 88 is magnetized in a multipolar configuration. It has also been discovered that by using a multipolar radially magnetized magnet for magnet 88, the magnetic flux travels the path shown in FIG. 3. This is desirable because it concentrates the magnetic flux in the center region of bearing sleeve 76 and shaft 74 whereby bearings 78 and 80 are not in the magnetic flux path. It may be that exposing bearings 78 and 80 to magnetic flux flowing could shorten their useful life span.

In the embodiment shown in FIG. 3, a "labyrinth" type seal is combined with a ferrofluid seal to provide a barrier to prevent material from entering the sealed interior chamber of the disc drive. This type of seal simply uses very close fittings between adjacent parts. In another embodiment which is not shown, a ferrofluid type seal such as that shown in FIG. 2 is used to provide a barrier.

In one embodiment, ferrofluid 90 on the order of 10–15 μl of CFF-200A ferrofluid which is available from Nippon Ferrofluidics Corporation, Chiba, Japan. The ferrofluid should be selected to provide low electrical resistance and low viscosity to reduce mechanical friction and drag. However a ferrofluid having viscosity of 25 cp or lower available from Nippon is preferred.

Figure 4:
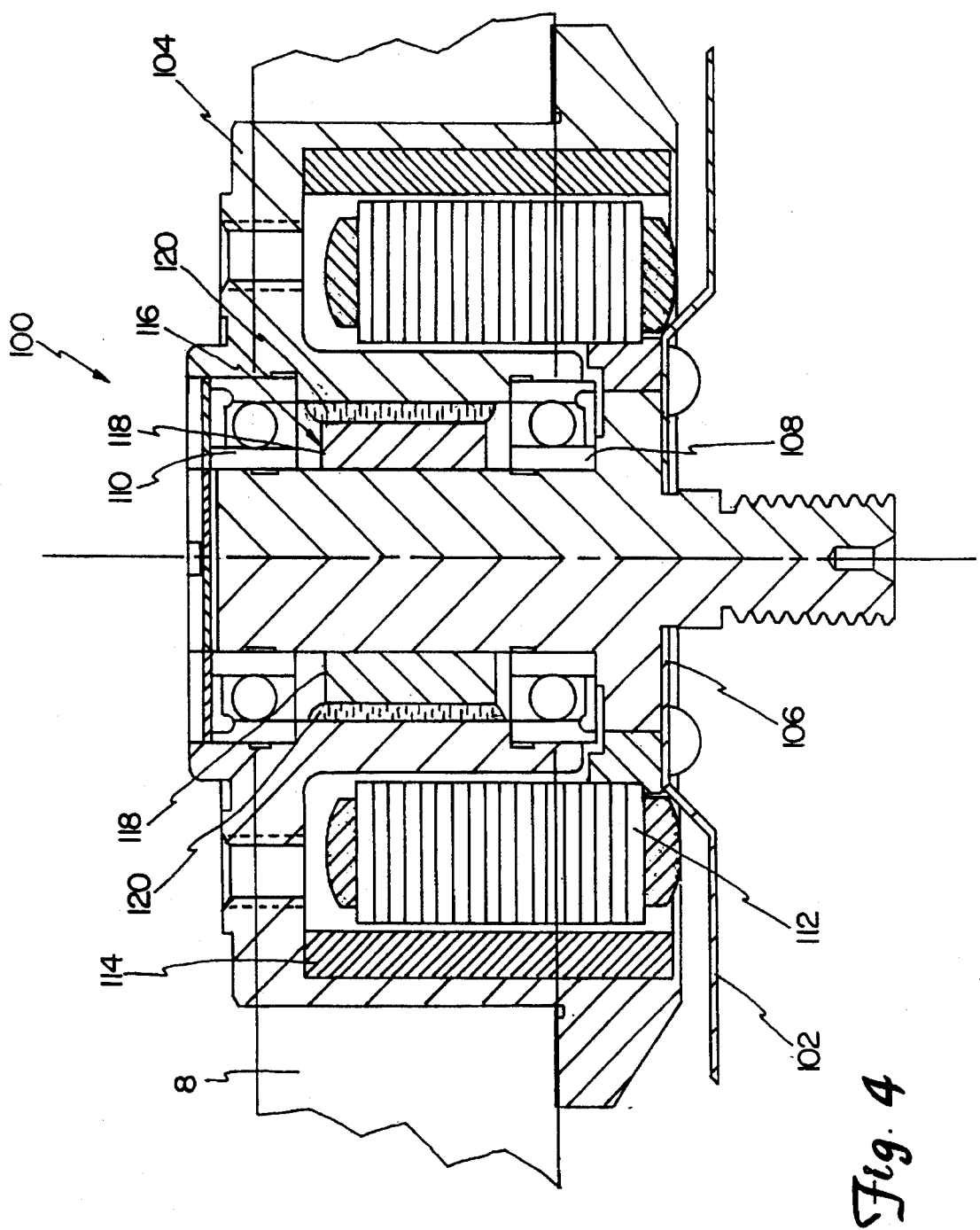
FIG. 4 is a cross-sectional view of a disc drive motor in accordance with another embodiment of the invention.

FIG. 4 is a cross-sectional view of disc drive motor 100 in accordance with another embodiment of the invention. Motor 100 includes motor base 102 and rotor hub 104. Motor 100 is of the "stationary shaft" design. Fixed member drive shaft 106 is coupled to motor base 102 and carries bearings 108 and 110 to rotatably carry rotor 104. Rotor 104 carries magnetic storage disc 8. Stator assembly 112 is fixedly coupled to shaft 106 and base 102, and interacts with permanent magnet 114 carried in hub 104 to cause rotation of hub 104 relative to fixed member 106.

In accordance with the invention, between bearings 108 and 110 is positioned conducting path 116, including permanent magnet 118 and ferrofluid 120. Permanent magnet 118 is coupled to fixed member 106 and maintains the position of ferrofluid 120 relative to hub 104. As discussed above, permanent magnet 118 is preferably coated with a conducting material such as nickel. The elongated interface between ferrofluid 120 and hub 104 provides the electrical path between hub 104 and fixed member 106. In another embodiment which is a variation on that shown in FIG. 4, permanent magnet 118 is fixedly attached to hub 104 and the ferrofluid interface is between magnet 118 and fixed member 106.

In the present invention, the bearings are spaced apart to provide room for the elongated ferrofluid interface. As shown in FIGS. 3 and 4, this spacing provides increased stability for the hub. This is significant because the greater spacing increases the resonant frequency of the system, thereby reducing the effects of the gyroscopic vibration frequency of the drive and other sources of interference which can cause tracking problems during reading and writing of information.

The present invention uses a ferrofluid interface to provide a controlled electrical ground path for the rotor of a disc drive motor. This is achieved by increasing the surface area of the ferrofluid interface and appropriately focussing the magnetic field. The ferrofluid path is positioned between the bearings which rotatable support the rotor on the fixed member. Additionally, the permanent magnet which maintains the ferrofluid interface is constructed to have high electrical conductivity by, for example, a nickel coating.

Although the present invention has been described with reference to preferred embodiments, workers skilled in the art will recognize that changes may be made in form and detail without departing from the spirit and scope of the invention. For example, the rotor could connect to something other than ground and the rotor could be left floating.

What is claimed is:

1. A disc drive motor for use in a disc drive for storing information, the disc drive motor comprising:

a motor base;

a fixed member coupled to the motor base;

a rotor rotatable about the fixed member for rotatably carrying a storage disc;

a first bearing between the rotor and the fixed member rotatably coupling the rotor to the fixed member;

a second bearing between the rotor and the fixed member and axially spaced apart from the first bearing rotatably coupling the rotor to the fixed member;

the first and second bearings allowing rotation of the rotor relative to the fixed member;

a permanent magnet positioned between the first and second bearings and electrically coupled to the fixed member, the permanent magnet extending over an elongated axial area; and a conductive ferrofluid between the rotor and the permanent magnet and maintained in operable contact with the rotor by the permanent magnet thereby providing a low resistance electrical path between the rotor and the fixed member.

2. The disc drive motor of claim 1 wherein the fixed member is a sleeve which receives the rotor.

3. The disc drive motor of claim 1 wherein the rotor is a sleeve which receives the fixed member.

4. The disc drive motor of claim 1 wherein the permanent magnet is coated with a conductive material.

5. The disc drive motor of claim 4 wherein the conductive material is nickel.

6. A disc drive motor for use in a disc drive for storing information, the disc drive motor comprising:

a motor base;

a fixed member coupled to the motor base;

a rotor rotatable about the fixed member for rotatably carrying a storage disc;

a first bearing between the rotor and the fixed member rotatably coupling the rotor to the fixed member;

a second bearing between the rotor and the fixed member and axially spaced apart from the first bearing rotatably coupling the rotor to the fixed member;

the first and second bearings allowing rotation of the rotor relative to the fixed member;

a permanent magnet positioned between the first and second bearings and electrically coupled to the fixed member, the permanent magnet extending over an elongated axial area; and a conductive ferrofluid between the fixed member and the permanent magnet and maintained in operable contact with the fixed member by the permanent magnet thereby providing a low resistance electrical path between the rotor and the fixed member.

7. The disc drive motor of claim 6 wherein the fixed member is a sleeve which receives the rotor.

8. The disc drive motor of claim 6 wherein the rotor is a sleeve which receives the fixed member.

9. The disc drive motor of claim 6 wherein the permanent magnet is coated with a conductive material.

10. The disc drive motor of claim 9 wherein the conductive material is nickel.

11. The disc drive motor of claim 6 wherein electrical resistance between the rotor and the fixed member during operation of the disc drive motor is less than about 2.5 m$\Omega$.

12. The disc drive motor of claim 6 wherein the permanent magnet is a multipolar magnet.

13. The disc drive motor of claim 6 wherein the permanent magnet is uni-polar.

\* \* \* \* \*